Figure 1:
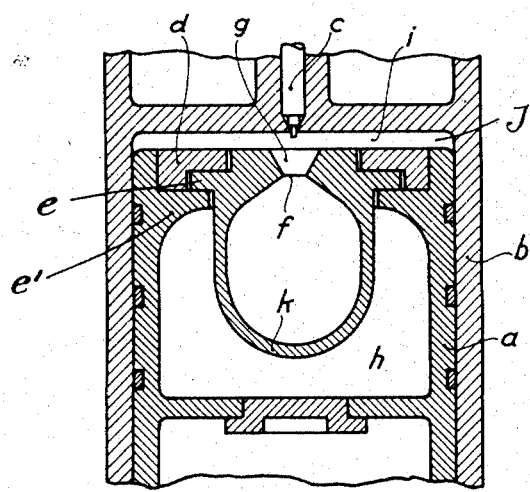

Oct. 22, 1929.

OIL MOTOR

Filed March 11, 1926

Patented Oct. 22, 1929

1,732,901

UNITED STATES PATENT OFFICE

FRANZ LANG, OF STUTTGART, GERMANY, ASSIGNOR TO ACRO AKTIENGESELLSCHAFT, OF KUSSNACHT-ON-THE-RIGI, SWITZERLAND

OIL MOTOR

Application filed March 11, 1926, Serial No. 94,070, and in Germany February 14, 1926.

The present invention relates to oil-engines having a supplemental compression-chamber in the piston body. According to this invention this supplemental compression-chamber, the interior of which is connected, at least at the moment of the ignition, with the main compression space positioned outside of the piston body only by means of a throttling constriction consists of a vessel which is arranged in a hollow space or recess of the piston body so as to leave an air-space between its walls and the interior walls of said hollow space or recess.

A piston arranged and equipped in this manner has been found of great utility in securing the proper feed and supply of compressed air during the combustion of the fuel and the properly graded mixing of the same with the fuel during the working stroke, and also in removing the danger of ruptures of the parts of the piston head under the great heat which they undergo in operation.

In the drawing I have shown in longitudinal central section two examples of engines embodying this invention.

In both examples $a$ designates the piston, $b$ the cylinder and $c$ the injecting nozzle for the fuel, said nozzle being adapted for solid injection of the fuel, that is, injection without air, as well as for injection of the fuel by means of pressure air. The supplemental compression-chamber, more particularly, consists of a vessel $k$ of imperforate bell-shaped conformation, said vessel being inserted into a hollow space or recess of the piston-body in such a manner that an air or heat-insulating space $h$ will remain intermediate the interior wall of the piston body and the exterior wall, of said vessel. As shown, the vessel $k$ forming the chamber is formed with an annular flange $e$ at its outer surface with which flange it rests upon a correspondingly formed supporting flange or shelf $e'$ of the piston, and is fixed to or secured in position on the latter by means of a clamp-ring $d$ which overlaps the flange $e$, and fits into a corresponding upper recess or mortise of the piston-head. Packings may be interposed between said ring $d$ and the flange $e$, on the one hand, and the supporting flange of the piston, on the other.

According to Fig. 1, which represents the first example of an engine constructed according to this invention, the injecting nozzle is formed as a displacing member, being arranged to project into the opening of the vessel $k$, in the upper dead center position, as shown, thereby leaving free a throttling ring-shaped constriction $f$ between the injecting nozzle and the opening of the vessel $k$ so that in this position the additional supplemental compression chamber will be connected with the main compression-space $j$ solely by this throttling constriction.

Figure 2:
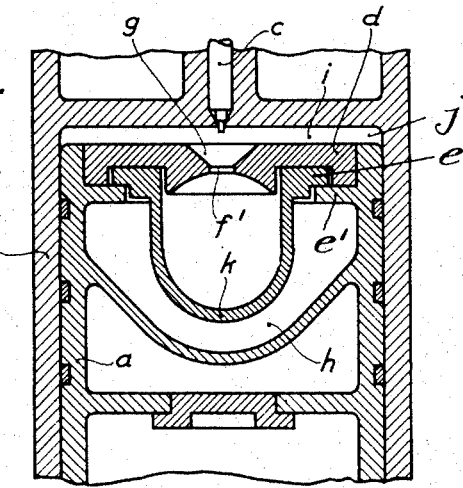

According to Fig. 2, which represents the second example of an engine constructed according to this invention, there is provided, in contra-distinction to the first example, a permanent throttling constriction $f'$ intermediate the supplemental compression-chamber and the main compression-space or chamber $j$. This constriction, therefore, according to Fig. 2 not only operates in the neighborhood of the upper-dead-center point position of the piston according to Fig. 1, but provides a permanently operating throttling connection between the supplemental and the main compression-space or chamber $j$. In order to bring about a very intimate fixing of fuel and air, a funnel-shaped space $g$ is provided in front of the throttling constriction. The ring $d$ in this case serves as a cover for the additional compression space formed by said vessel and is equipped with the throttling constriction which in this instance consists solely of a single perforation $f$ in the ring or cover $d$. The fuel-nozzle and the throttling aperture, as shown, are positioned co-axially with respect to each other. Instead of forming the constriction of a single perforation, it is within my invention to form the same of a plurality of narrow apertures or of one or more straight or curved slots.

The vessel $k$ under the influence of the heat of combustion may freely expand in all directions without thereby exerting any stress or pressure upon the walls of the piston, this being essentially due to the mode of fastening the vessel by the ring as shown in both figures. Ruptures of the vessel $k$ as well as of the piston body will thus be avoided.

This invention is especially well suited for self-igniting oil engines with or without auxiliary ignition for the starting. It may, however, be also advantageously employed with other kinds of oil-engines, such, as for instance, oil engines which are ignited by means of an incandescent bulb. The invention is equally applicable to engines operating according to the two-stroke cycle, the four-stroke cycle or any other process.

What I claim and desire to secure by Letters Patent is:

1. In an oil-motor comprising a cylinder and a piston arranged to work therein, a piston with a hollow space or recess at its head, in combination with a supplemental compressed air chamber seated in said recess, and spaced apart from the walls of said recess to leave an air space between the same and the supplemental chamber, and means for throttling the passage of air between the supplemental chamber and the cylinder space at least at the time of ignition.

2. In an oil-motor comprising a cylinder and a piston working therein, a piston formed with a hollow space or recess at its head, in combination with a supplemental compressed air chamber formed at its exterior with a flange, mounted with the flange on the piston head and spaced apart from the walls of said recess to leave an air space between the same and the supplemental chamber.

3. In an oil-motor comprising a cylinder and a piston working therein, a piston formed with a recess at its head, in combination with a supplemental compressed air chamber formed at its exterior with a flange and seated on the piston head with the flange resting on said piston head, and a retaining ring arranged over the said flange and secured to the piston-head to retain the air chamber thereon.

4. In an oil-motor comprising a cylinder and a piston arranged to work therein, a piston formed with a recess at its head, in combination with a supplemental compressed air chamber formed at its exterior with a flange and seated on the piston-head with the flange resting on said piston head, and a retaining ring arranged over the said flange and secured to the piston-head to retain the air-chamber thereon; said ring being formed as a cover provided with a throttling constriction for the said air chamber.

5. In an oil-motor a cylinder, a piston arranged to work therein, and a fuel injecting device, the piston being formed with a recess at its head. In combination with a supplemental compressed air chamber seated in said recess, said supplemental chamber being formed with a throttling constriction for communication with the cylinder space and a funnel-shaped space in advance of the constriction and facing the fuel injecting device, whereby the injected fuel is caused to enter into contact with the air in the main compression space in the cylinder before reaching the supplemental chamber.

6. In an oil motor, a cylinder and a piston arranged to work therein, the piston being formed with a recess at its head, in combination with a supplemental compressed air chamber formed at its exterior with a flange arranged to rest on the piston-head and a retaining ring arranged to secure the supplemental chamber in place on the piston head, said ring being formed as a cover provided with a throttling constriction and a funnel shaped outwardly flaring space or recess.

7. In an oil-motor a main air compression space and a supplemental air-compression space formed as an imperforate bell-shaped body and arranged to communicate with the main air-compression space by a throttling constriction in combination with a ring-shaped insertion arranged to hold the bell-shaped body in place and formed with a funnel-shaped extension flaring outwardly from the interior of said body.

8. In an oil-motor a main compression space and a supplemental air-compression space formed as an imperforate bell-shaped body in combination with a ring-shaped insertion arranged to cover and to hold the bell-shaped body in place and formed with a throttling constriction for establishing communication between the interior of the bell-shaped body and the main compression space.

In testimony whereof I have hereunto affixed my signature.

FRANZ LANG.